3,798,282
SELECTIVE SEPARATION OF XYLENES BY CRYSTAL SIZE CLASSIFICATION

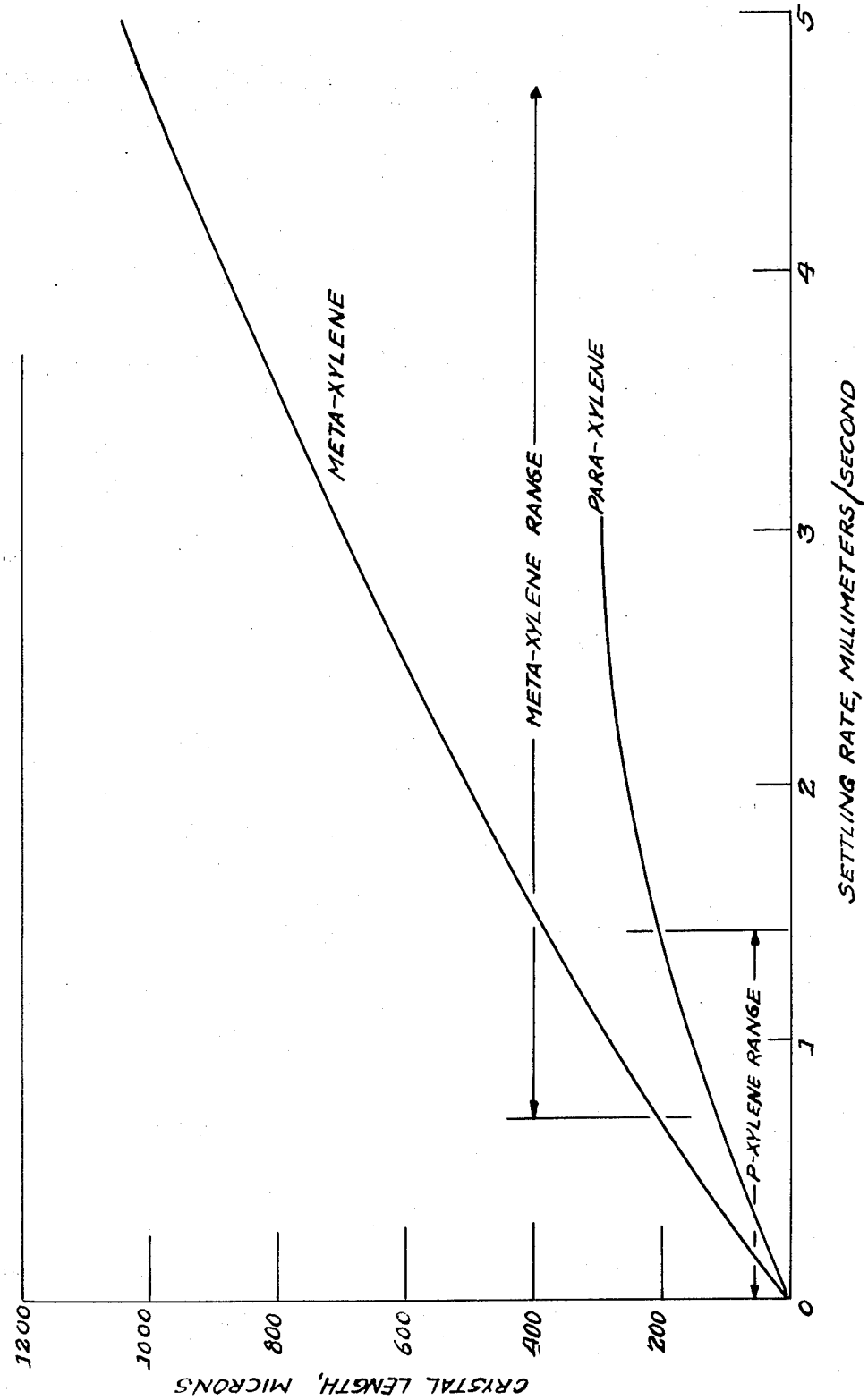

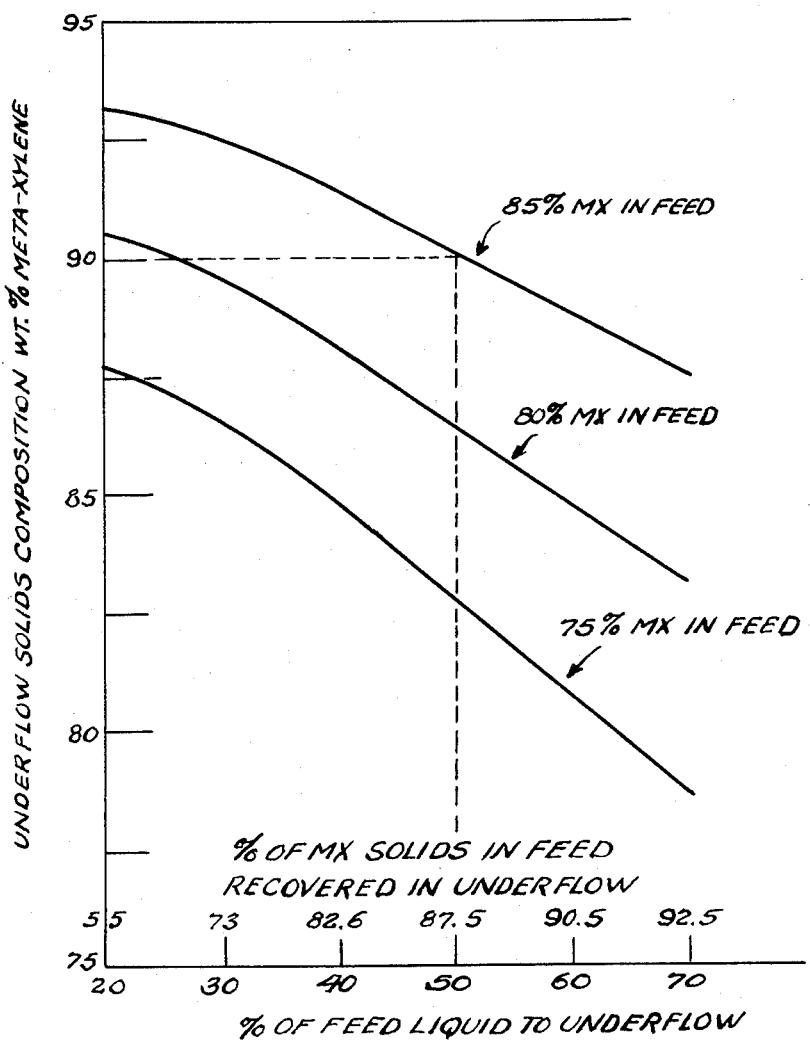

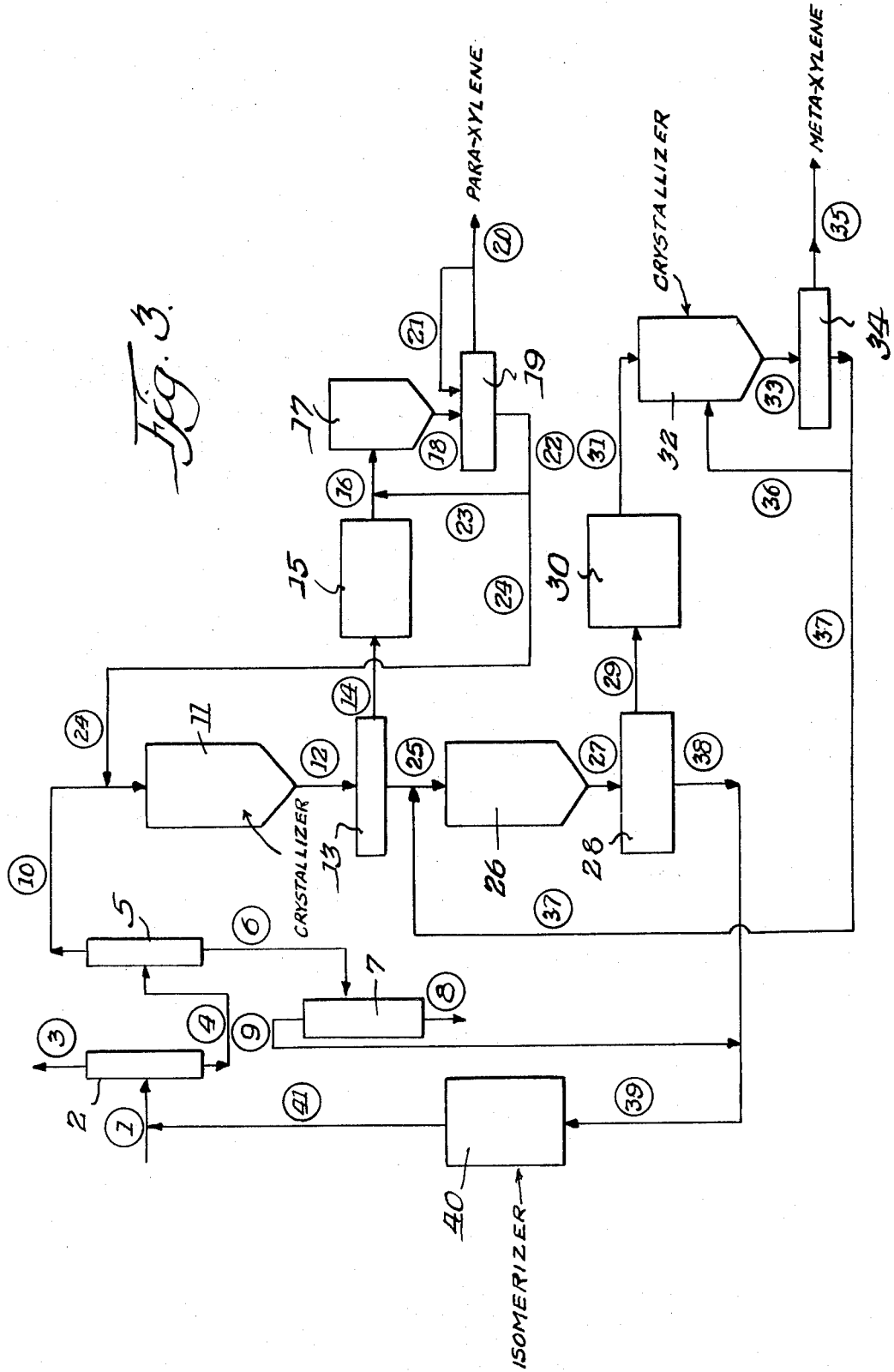

Alan G. Bemis, John K. Darin, and Melvern C. Hoff, Naperville, Ill., assignors to Standard Oil Company, Chicago, Ill.
Filed Aug. 11, 1972, Ser. No. 279,853
Int. Cl. C07c 7/14
U.S. Cl. 260—674 A                   32 Claims

ABSTRACT OF THE DISCLOSURE

A process is provided for recovering high purity meta-xylene from mixtures of primarily $C_8$ aromatic isomers (1) by cooling such a mixture to form a slurry of liquor and discrete meta- and para-xylene crystals of different size and shape, (2) by classifying crystals of the two species on the basis of their different size and shape and/or settling rates to obtain a crystal stream enriched in meta-xylene, and (3) by concentrating the meta-xylene rich crystal solids. Partial melting or complete melting and recrystallizing can be used for further purification to obtain very high purity meta-xylene.

BACKGROUND OF THE INVENTION

This invention relates generally to a process for separating compounds with low boiling point differentials, and more particularly to a process for selectively separating meta-xylene and para-xylene by crystal size classification. More specifically, however, this invention is concerned with the recovery of highly purified meta-xylene, preferably in the range of 95 to 99 percent purity by crystallizing a mixture of meta- and para-xylene containing primarily $C_8$ aromatic isomers under controlled conditions to obtain a mixture of meta- and para-xylene crystals and then separating the meta- and para-xylene crystals by virtue of the differences in their crystal size and shape. After concentrating the meta-xylene rich solids, partial melting or complete melting and recrystallization may be used if necessary to attain the desired final meta-xylene composition.

In recent years an increased need has developed for meta-xylene rich feedstocks to be used, for example, in making isophthalic acid and related products. On the one hand, little difficulty has occurred in effecting the separation of ethylbenzene and ortho-xylene from $C_8$ mixtures by fractionation, primarily because of the relatively large boiling point differences between those $C_8$ components and related $C_8$ components. On the other hand, however, great difficulty has been experienced in effectively separating meta-xylene and para-xylene by fractionation because of the small 0.8° C. boiling point difference which exists between the components.

As a consequence, a variety of crystallization techniques have been attempted to separate meta-xylene from para-xylene, but none has proved commercially successful in selectively producing high concentrations of meta-xylene. Most commercial para-xylene crystallization processes, for example, produce meta-xylene rich reject filtrate streams (after para-xylene recovery has been accomplished) which contain as much as 8 to 13 percent para-xylene. Efforts to crystallize such mixtures to obtain high purity meta-xylene, have resulted in the formation of mixtures of para- and meta-xylene crystals, which at best provide an unsatisfactory resultant equilibrium composition having about 88 percent meta-xylene and 12 percent para-xylene.

As a result, a variety of rather complex and expensive schemes have been proposed to overcome these difficulties and obtain high purity meta-xylene. It has been suggested, for example, that meta-xylene can be recovered by sulfonation, adductive crystallization, clathration or adsorption. But in most of these situations, a third component must be introduced into the separation system, which, in turn, requires additional equipment for the subsequent separation and recovery of this third component. In the case of meta-xylene separation by selective sulfonation, considerable equipment is required merely to recover and reconcentrate sulfuric acid. Likewise, the use of $HF-BF_3$ for meta-xylene recovery requires the handling of corrosive gases and expensive special alloys for operating plant equipment.

Clathration techniques, on the other hand, require the mechanical handling of approximately 8 to 10 times the mass of extraneous materials relative to the component to be separated, and thus, is highly expensive on the basis of energy requirements alone. Finally, even adsorption techniques, in which one isomer component is adsorbed on a solid adsorbent, require large initial inventments in adsorbents that can be readily inactivated by contaminants contained in the isomer feedstock.

As a consequence of these and various other disadvantages inherent in the prior art separation processes, a considerable need has developed for a reliable but less expensive process for recovering high purity meta-xylene.

SUMMARY OF THE INVENTION

It has now been discovered, in accordance with this invention, that when meta- and para-xylene containing mixtures of primarily $C_8$ aromatic isomers are crystallized under controlled conditions, a mixture of discrete meta- and para-xylene crystals are obtained which differ sufficiently in size and shape to permit their separation by classification. The invention may also be applied more broadly to a mixture of meta-, ortho and para-xylene crystals. It has also been found that meta-xylene crystals formed from the crystallization of a mixture of $C_8$ aromatic isomers are larger than ortho-xylene crystals, which, in turn, are larger than para-xylene crystals.

Thus, in accordance with this invention, concentrates of meta-xylene and high purity meta-xylene are produced without fractionation by: (1) cooling a mixture of primarily $C_8$ aromatic isomers containing para-, meta-, and ortho-xylene to a low enough temperature and for a time sufficient to provide a slurry of liquor and crystals, the crystals containing less than 10 percent by weight ortho-xylene crystals, (2) physically classifying, in accordance with the relative size and shape of their respective crystals, meta-xylene, ortho-xylene, para-xylene, and (3) concentrating the meta-xylene rich crystal solids by separating most of the filtrate. Partial melting or complete melting and recrystallization may be used for further enrichment, as for example, to 99% meta-xylene.

BRIEF DESCRIPTION OF THE DRAWINGS

This invention will be more readily understood by reference to the following drawings, in which:

FIG. 1 is a graphic illustration of the settling rates for para- and meta-xylene in mixtures of xylenes showing specifically that meta-xylene crystals, as discussed in more detail in Example 3, settle more rapidly than para-xylene crystals.

FIG. 2 is a graphic illustration of the feasibility of separating meta- and para-xylene by means of cyclone separation as described in more detail in Example 6.

FIG. 3 is a process flow diagram of commercial scale equipment designed to separate meta- and para-xylene in accordance with the process of this invention.

DESCRIPTION OF EMBODIMENTS

By the process of this invention, high purity meta-xylene can be selectively separated from mixtures of primarily $C_8$ isomers containing meta-xylene, para-xylene, ethylbenzene and ortho-xylene.

Although the mixture of $C_8$ isomers will desirably have meta- and para-xylene present in substantially their eutectic ratio, the invention may also be successfully applied to mixtures other than the eutectic ratio. The eutectic ratio of meta- and para-xylene varies with concentration of these two components. For example, in a binary mixture containing only para- and meta-xylene, the eutectic ratio for meta- and para-xylene is about 87 to 13 meta- to para-xylene. In the case of a $C_8$ isomer mixture having only a combined meta- and para-xylene concentration of 25 percent, the eutectic ratio is about 91 to 9 meta- to para-xylene.

In any event, however, it has been determined that highly desirable starting materials for use in the practice of this invention are the typical reject filtrate streams obtained from para-xylene recovery plants. One reason for this preference of reject filtrate streams, of course, is their ready availability from existing para-xylene recovery plants at a temperature close to that desired in subsequent crystallization. Furthermore, such reject filtrate streams generally contain concentrations of meta- and para-xylene in approximately their eutectic ratio.

A suitable reject filtrate stream containing a mixture of $C_8$ isomers that is useful in the practice of this invention includes about 8 to 13 percent by weight para-xylene, about 8 to 20 percent by weight ethylbenzene and about 15 to 25 percent by weight ortho-xylene, the remaining portion of the mixture being meta-xylene. More specifically, a typical starting material for use in this invention would include: about 18 percent by weight ethylbenzene, 10 percent by weight para-xylene, 59 percent by weight meta-xylene and 13 percent by weight ortho-xylene.

The concentration of ortho-xylene contained in the mixture is desirably adjusted to a level below the eutectic ratio of ortho- and meta-xylene. This requires the removal of sufficient ortho-xylene so that the required amount of meta xylene can be crystallized without first reaching the ortho-xylene eutectic. It has been determined that a reduction in the ortho-xylene concentration below the eutectic ratio of ortho- and meta-xylene results in several distinct advantages. First, it reduces operating costs, since crystallization of a $C_8$ mixture containing substantial amounts of ortho-xylene is more costly. Secondly, and more importantly, a reduction in the quantity of ortho-xylene crystals formed upon crystallization and present in the mixture of discrete meta- and para-xylene crystals, or, preferably, the complete elimination of ortho-xylene crystals, of course, simplifies the classification step, since only two types of discrete crystals (meta- and para-xylene crystals) need be classified. Any means to remove ortho-xylene can be employed, but fractionation is the simplest and preferred method. If fractionation is employed, ortho-xylene removal is most advantageously accomplished before, rather than after, para-xylene crystallization.

After selection and preparation of a suitable mixture of primarily $C_8$ isomers, the mixture is cooled in a crystallizer for a time and at a temperature sufficient to yield a slurry of liquor and discrete crystals of the desired solids concentration; the mixture of discrete crystals so formed containing less than 10 percent by weight ortho-xylene. Preferably, however, the mixture of $C_8$ isomers is cooled for a time and at a temperature above which no $C_8$ isomers other than meta-xylene and para-xylene crystallize. In this way, as discussed previously, only two discrete types of crystals, e.g., meta- and para-xylene, will be present in the solid crystal phase and, thus, ultimate separation by classification is simplified.

Typical cooling temperatures used in the practice of this invention vary from about $-65°$ to $-90°$ C. Naturally, the percent solids formed during crystallization varies as the feed composition, cooling temperatures, and crystallizer residence time vary. Preferably, however, crystallization is carried out until a manageable slurry of liquor and solid crystals results, e.g., a slurry having a solids content in the range of 10 to 40 percent and, preferably, 10 to 30 percent. Slurry of lower solids concentration can be handled by the process of the invention. However, operation of the process is more costly at lower solids concentrations.

Once discrete crystals, differing in size and shape, are formed, a number of size and shape classification techniques can be employed to effect the ultimate recovery of meta-xylene. Classification can be accomplished for example, by screen, cyclone, centrifuge, or settling techniques, or for that matter, by any known physical or chemical classification technique which can separate discrete crystals by differences in their size, shape or settling rate.

It has been discovered, therefore, that the process of this invention can be effectively used to separate meta- and para-xylene in a commercial scale operation, without the need for third components being introduced and then removed from the separation system. The process is highly compatible with existing para-xylene recovery facilities and can easily take advantage of existing refrigeration capacity in such facilities. Moreover, no corrosive components, nor expensive equipment, are required to commercialize the process, and yet high purity meta-xylene, in the range of 95 to 99 percent by weight, can be recovered.

The numerous advantages of this invention will be further described and illustrated with the aid of the following examples. All parts and percentages are by weight unless otherwise indicated.

Example 1

Table I summarizes data from actual tests in which typical mixed xylene feeds were crystallized to obtain mixtures of meta- and para-xylene crystals, and in which the crystal sizes were measured. The laboratory crystallization vessel was a 1.5-liter glass vessel jacketed so that coolant could be circulated around the outer walls. Stirring was accomplished by nylon scrapers which rotated with spring tension against the inside walls to prevent the buildup of any crystals. The pilot plant crystallization vessel was a 12-gallon, stainless steel vessel fitted with jackets through which coolant was circulated and fitted internally with scrapers to provide stirring and to prevent buildup of crystals on the walls. Both the laboratory and pilot plant vessels were designed to simulate typical commercial para-xylene crystallizers.

Crystal sizes were measured by withdrawing samples from the vessels and charging them to a specially designed photomicroscopy unit (Photo-Dewar) in which the crystals could be maintained at the temperature at which they were grown and photographs of samples taken. The photographs were then enlarged and in this set of experiments crystals sizes were made by measurement of the crystals in the photographs. Table I summarizes the conditions of the crystallization and compares the average crystal size of the para-xylene and the meta-xylene crystals which co-crystallized. It should be noted from these data that the average size for meta-xylene crystals is greater by a factor of 30 to 300 than the average para-xylene crystal size. Thus, any screening device with suitable apertures can effect a classification of this crystal mixture to form a concentrate richer in meta-xylene than the original crystals present in the mixture and another concentrate correspondingly richer in para-xylene.

smallest crystals, and by repetitive partial melting and slow recooling which produced the largest crystals.

TABLE I.—CRYSTAL SIZES FROM MIXED XYLENE CRYSTALLIZATION

| Feed [1] | Type of operation | Crystallization temp., °C. | ΔT, °F.[2] | Average crystal size (micron)[3] | | Size ratio [4] |
|---|---|---|---|---|---|---|
| | | | | Para-xylene | Meta-xylene | |
| A | Batch† | −69.5 | 2 | 100 x 10 | 300 x 100 | 30 |
| A | Continuous | −70.0 | 16 | 100 x 15 | 1,000 x 250 | 167 |
| A | do | −70.0 | 21 | 100 x 10 | 700 x 250 | 175 |
| A | Batch | −70.0 | 14 | 150 x 10 | 800 x 300 | 160 |
| A | Continuous | −70.6 | 26 | 100 x 10 | 900 x 300 | 270 |
| A | Batch | −68.7 | 2 | 100 x 10 | 500 x 150 | 75 |
| A | Continuous | −67.3 | 7 | 100 x 10 | 800 x 150 | 120 |
| B | Batch | −75.5 | 2 | 100 x 10 | 300 x 150 | 45 |
| B | Continuous | −75.5 | 10 | 100 x 15 | 700 x 200 | 93 |
| B | do | −75.5 | 16 | 150 x 15 | 1,200 x 400 | 17 |
| A | do | −76.0 | 24 | 100 x 15 | 1,300 x 350 | 303 |
| A | do | −70.0 | 16 | 150 x 15 | 1,500 x 400 | 267 |
| A | do | −70.0 | 29 | 100 x 15 | 1,200 x 400 | 320 |
| A | do | −70.0 | 23 | 150 x 15 | 1,200 x 400 | 213 |

[1] Feed A=18.4% EB, 9.0% PX, 60.0% MX, 12.5% OX. Feed B=25.2% EB, 7.2% PX, 50.9% MX, 16.3% OX.
[2] Temperature difference between coolant temperature and crystallizer solution temperature.
[3] Thickness of crystals is estimated to be about the same as width for PX crystals, about 10-50 microns for MX crystals.
[4] Size ratio=(width x length of MX crystals)/(width x length of PX crystals).

Example 2

Tests were run with mixed xylene feeds in a pilot plant to obtain actual crystal size distribution with respect to the co-crystallized meta- and para-xylene isomers when crystallization was carried out continuously and under simulation of typical commercial operation. These data are summarized in Table II and unexpectedly show that nearly all of the para-xylene crystals are less than 200 microns in length whereas about 95% of the meta-xylene crystals by weight are greater than 200 microns in length. These crystal size distributions were obtained by withdrawing samples from the crystallizer, charging them to the Photo-Dewar and taking photographs of the mixed crystals. Crystal size distributions were then obtained by using a model TGZ3 Zeiss Particle Size Counter. These data are those used to show the typical crystal size ranges in FIG. 1 (Example 3) and also show that the use of any screening device with suitable apertures can effect a separation of meta- and para-xylene crystals from such slurries of mixtures.

The settling rates of meta-xylene crystals and para-xylene crystals were measured in the laboratory in an 18-inch tube with a one-inch diameter which was immersed in a constant temperature bath at identical temperature with the crystallizer. The crystals were observed through a small telescope mounted on a scale so that it could be raised or lowered. The settling of crystals was measured by following one crystal, and recording the time it took to fall a standard distance, usually 10 cm. In a given run, the settling rates of 100 to 200 crystals were measured.

The procedure followed was to transfer some of the crystals from the crystallizer to the sample vessel in a thermostated bath. Some of these crystals were photographed and their sizes measured, and some were transferred into the settling tube (within the same thermostated bath). Ten different runs were made—six for meta-xylene, and four for para-xylene. In each case, at least 100 settling measurements were made and 20 photographs taken.

To estimate the settling rate for each size particle, the settling rates for each run were listed in order of rate and divided into ten percentile groups. Similarly for each TABLE II.—CRYSTAL SIZE DISTRIBUTIONS OF META- AND PARA-XYLENE IN PILOT PLANT SLURRIES SAMPLED FROM THE BOTTOM OF THE CRYSTALLIZER

| Residence time,[1] fresh feed, min. | Feed composition | | ΔT,[2] °F. | Residence time,[3] external recycle, min. | Crystal size distribution—wt. percent of the total solids between the listed intervals (microns) | | | | | | |
|---|---|---|---|---|---|---|---|---|---|---|---|
| | Percent PX | Percent MX | | | 0-100 | 100-200 | 200-300 | 300-400 | 400-500 | 500-600 | 600-700 |
| Meta-xylene | | | | | | | | | | | |
| 45 | 9 | 58 | 24 | 2.0 | .1 | 3.3 | 14.7 | 19.7 | 26.0 | 30.9 | 5.3 |
| 45 | 9 | 58 | 38 | 2.0 | .1 | 2.6 | 12.0 | 28.0 | 31.3 | 19.5 | 6.5 |
| Para-xylene | | | | | | | | | | | |
| 45 | 9 | 58 | 24 | 2.0 | 74.8 | 25.2 | | | | | |
| 45 | 9 | 58 | 38 | 2.0 | 73.1 | 26.9 | | | | | |

[1] All runs are continuous.
[2] Difference between coolant temperature and slurry temperature. Crystallization temperatures were approximately −99° F.
[3] Residence time in crystallizer due to external recycle.

Example 3

Table III summarizes data on the settling rates of para-xylene crystals and meta-xylene crystals as a function of crystal size. In these tests, feeds similar to those used in Example 1 were employed, but, in one case, meta-xylene was replaced with ethylbenzene so that only para-xylene would crystallize and in the other case, para-xylene was replaced with ethylbenzene so that only meta-xylene would crystallize. Thus, crystals of only one component formed. The temperature employed was about −73° C. Different sizes of crystals were grown by controlling the nucleation and suspersaturation conditions of the system.

In a given test, crystals of one size were made in the laboratory crystallizer as described in Example 1. It was possible to make various sizes of crystals by either rapid crystallization from shock nucleation, which produced the run, the measured crystal sizes were listed in order of size, and divided into ten percentile groups. For each run, the size deciles and rate deciles were equated. These data are listed in Table III.

These data were then used to plot the settling rate curves shown in FIG. 1. These data also show that in the typical mixtures of crystals obtained from crystallizing xylene mixtures (Table 11, Example 2) that about 95% of the meta-xylene crystals are larger than 200 microns and, thus, settle more rapidly than para-xylene crystals of which about 95% are smaller than 200 microns. Thus, most of the meta-xylene crystals will settle at a much faster rate than the accompanying para-xylene crystals and separation by any sedimentation device such as a centrifuge or an elutriation tower will indeed provide separation or concentration of the xylene isomers with respect to each other.

TABLE III.—COMPARISON OF SETTLING RATES AND CRYSTAL SIZES AT −73° C.

Values of settling rates (cm./sec.) and size (length in mm.) which each decile of the crystals had—

| Decile[1] | 0-10 | 10-20 | 20-30 | 30-40 | 40-50 | 50-60 | 60-70 | 70-80 | 80-90 | 90-100 |
|---|---|---|---|---|---|---|---|---|---|---|
| Para-xylene crystals | | | | | | | | | | |
| Settling rate | .02 | .03 | .033 | .037 | .037 | .038 | .04 | .048 | .06 | .062 |
| Size | .05 | .05 | .05 | .05 | .05 | .1 | .1 | .1 | .1 | .1 |
| Settling rate | .02 | .035 | .05 | .07 | .078 | .1 | .13 | .2 | .3 | .5 |
| Size | .03 | .05 | .075 | .1 | .1 | .15 | .2 | .2 | .25 | .37 |
| Settling rate | .025 | .03 | .04 | .05 | .05 | .06 | .075 | .08 | .09 | .15 |
| Size | .05 | .05 | .075 | .1 | .1 | .13 | .17 | .2 | .2 | .32 |
| Settling rate | .01 | .02 | .02 | .02 | .02 | .03 | .03 | .03 | .04 | .05 |
| Size | .03 | .03 | .05 | .05 | .05 | .1 | 1 | .1 | .17 | .25 |
| Meta-xylene crystals | | | | | | | | | | |
| Settling rate | .05 | .06 | .07 | .1 | .11 | .14 | .2 | .25 | .35 | .46 |
| Size | .1 | .15 | .18 | .25 | .26 | .3 | .35 | .45 | .51 | 1.0 |
| Settling rate | .025 | .035 | .05 | .06 | .07 | .08 | .09 | .11 | .13 | .16 |
| Size | .05 | .12 | .17 | .30 | .35 | .37 | .42 | .5 | .62 | .72 |
| Settling rate | .03 | .04 | .04 | .05 | .06 | .07 | .085 | .095 | .11 | .13 |
| Size | .1 | .15 | .2 | .2 | .2 | .2 | .22 | .25 | .3 | .35 |
| Settling rate | .035 | .055 | .065 | .085 | .095 | .1 | .11 | .13 | .16 | .2 |
| Size | .075 | .125 | .2 | .27 | .33 | .4 | .47 | .5 | .52 | .57 |
| Settling rate | .035 | .05 | .07 | .1 | .13 | .18 | .25 | .3 | .4 | .5 |
| Size | .05 | .07 | .12 | .2 | .3 | .37 | .4 | .47 | .6 | 1.0 |
| Settling rate | .02 | .025 | .03 | .03 | .03 | .03 | .03 | .04 | .04 | .05 |
| Size | .05 | .07 | .10 | .1 | .1 | .1 | .13 | .17 | .22 | .35 |

[1] Deciles from settling rates and deciles from crystal sizes are set in 1 to 1 correspondence.

Example 4

This example, summarized in Table IV, was carried out to show that simple gravity settling can be used to obtain concentrates of meta-xylene. In this example, 1100 grams of the feed was crystallized at −65.7° C. in the laboratory crystallizer described in Example 1. After crystallization, the contents of the crystallizer was discharged into another vessel in a cooling bath at precisely the same temperature. This vessel permitted very gentle stirring of the slurry. The slurry was stirred very slowly at about 1 to 3 r.p.m. so that partial settling occurred. At that point the upper 78% of the vessel contents comprising the clear liquor and slurry was withdrawn overhead. The remaining lower portion was then allowed to settle further and the liquid withdrawn from this material through a small aperture, the crystals themselves acting as a partial filter. Some smaller crystals were also withdrawn in this process. There resulted 30 grams of a crude solids wet with mother liquor. This crude solids was found to contain 10.7 grams of a meta-xylene/para-xylene crystals containing 95.4% meta-xylene and 4.6% para-xylene. These results demonstrate that the original feed mixture of 12% para-xylene/88% meta-xylene, approximately a eutectic composition, could be enriched to a mixture containing considerable meta-xylene in excess of the para-xylene. From such a mixture as obtained as the final product, more than half of the meta-xylene could be recovered as pure meta-xylene by simple recrystallization.

summarized in Table V. A portion of this slurry was fed to a 5″ International Centrifuge-Chemical Model, with a perforated basket lined with filter paper. The centrifuge had been modified so that the bowl was in a constant temperature box which could be maintained at the same temperature as the crystallizer. There was obtained 381 grams of mother liquor, 30 grams of a solid product containing smaller amounts of mother liquor. The solids content of this product was found to be 27 grams which contained 13.2% para-xylene and 86.8% meta-xylene, and actually shows a slight enrichment in favor of para-xylene for this portion of the experiment. In the second part of the example, the same centrifuge was used except that the perforated bowl was replaced with a solid bowl which was filled with ethylbenzene and rotated at a relatively low speed of about 800 to 1000 revolutions per minute. The remaining slurry was then slowly charged to this bowl, the larger crystals settling to the outer edge of the bowl and the excess liquid flowing over the lip of the bowl along with smaller crystals. There resulted an overflow of 463 grams and an underflow remaining in the bowl of 141 grams. The solid contents of the overflow was found to be 31.9 grams comprising 22% para-xylene and 78% meta-xylene, highly enriched in para-xylene compared to the solids in the original slurry. The solid contents of the underflow was found to be 35.6 grams and comprised 8.4% para-xylene and 91.6% meta-xylene. Thus, the original approximately eutectic mixture of 12%

TABLE IV

Separation by crystal size settling

| | | Settling | | Decantation of underflow | Solid contents with mother liquor removed | |
|---|---|---|---|---|---|---|
| | Feed | Overflow | Underflow | Drawoff | Crude solids | Total in underflow | After decanting |
| Total weight, g | 1,100 | 773 | 110 | 80 | 30 | 18 | 10.7 |
| Ethylbenzene, percent | 14.5 | 16.1 | 14.7 | 15.6 | 12.3 | | |
| Paraxylene, percent | 8.8 | 8.4 | 8.0 | 8.4 | 6.8 | 7.3 | 4.6 |
| Metaxylene, percent | 64.5 | 63.3 | 66.0 | 64.1 | 71.6 | 92.7 | 9.54 |
| Orthoxylene, percent | 11.5 | 12.3 | 11.2 | 11.9 | 9.3 | | |

Example 5

In this example, 1100 grams of a typical feed was crystallized at −65.9° C. in the laboratory crystallizer described in Example 1. The results of the experiment are para-xylene, 88% meta-xylene in the feed mixture had been enriched in meta-xylene to 91.6%. From such a mixture about ⅓ of the meta-xylene can be recovered in high purity by simple recrystallization.

TABLE V.—SEPARATION OF META XYLENE BY CRYSTAL SIZE

| | Centrifugal filter | | | | Solid bowl centrifuge | | | | |
|---|---|---|---|---|---|---|---|---|---|
| | Feed | Mother liquor | Total solids | Solids ex. mother liquor | Feed | Overflow | Overflow solids ex. mother liquor | Underflow | Underflow solids ex. mother liquor |
| Total weight, g | | 381 | 30 | 27 | | 463 | 31.9 | 141 | 35.6 |
| Ethylbenzene, percent | 14.5 | 15.9 | 1.9 | | 14.5 | 15.0 | | 12.3 | |
| Paraxylene, percent | 8.8 | 8.6 | 12.7 | 13.2 | 8.8 | 9.6 | .22 | 8.8 | 8.4 |
| Metaxylene, percent | 64.5 | 62.6 | 84.2 | 86.8 | 64.5 | 64.1 | 77 | 69.5 | 91.6 |
| Orthoxylene, percent | 11.7 | 12.0 | 1.2 | | 11.7 | 11.3 | | 9.3 | |

Example 6

Table VI summarizes a series of separations carried out on pilot plant equipment. The crystallizer used in Example 6 was the 12-gallon vessel described in Example 1 fitted with a pump and a loop in which was installed a Bauer 500 cyclone with the original 3/16" ID apertures enlarged to 0.218 inch for the feed and overflow lines and to 0.375 inch for the underflow line. The feed used for this series of runs contains 20.2% ethylbenzene, 9.3% para-xylene, 57.6% meta-xylene, 12.7% ortho-xylene, and 0.21% paraffins, naphthenes and other trace components. The run conditions for the crystallizer and the conditions under which the cyclone was operated are summarized in Table VI. The normal procedure was to line out the crystallizer at the prescribed operating conditions and then to take various samples from the overflow and underflow of the cyclone under different operating conditions. Generally, the feed rate to the cyclone was in the order of 4½ to 7 gallons per minute. From these data the correlations shown in FIG. 2 were developed. These data relate the percent meta-xylene in the mixed meta-/para-xylene solids of the crystallizer slurry to the percent of feed taken off at the underflow of the cyclone and the percent of the meta-xylene solids recovered in the underflow to the composition of the solids in the underflow from the cyclone. Thus, for example, with a feed to the cyclone in which the content of the solids of the slurry was 85% meta-xylene/15% para-xylene and with 50% of the feed to the cyclone taken as the underflow, the resulting underflow solids composition would be about 90% and this would represent an 87.5% recovery of the total meta-xylene solids in the cyclone feed. These data, of course, represent only the correlations for the particular cyclone used in this test, and other similar correlations could be readily developed by one skilled in the art for other cyclones. It is also quite evident from these data that it is advantageous to start with a feed containing as close as possible to the eutecic mixture of meta-xylene and para-xylene. Thus, for example, if one starts with a feed to the cyclone in which the solids contain 87½% meta-xylene, one can recover 87½% of this material containing 92% meta-xylene. Also, if one chooses to recover less of the solids by allowing a smaller amount of liquid to flow through the underflow of the cyclone, such as about 20% of the total liquid, then the recovered solids will contain nearly 95% meta-xylene.

Example 7

Data in this example were obtained to show that the desired classification can also be obtained in a commercial type centrifuge. In this example a Bird 40" x 60" Screen-Bowl centrifuge generally operated at a feed rate of about 150 gallons per minute is used. In normal operation this machine rejects a certain amount of the smaller crystals in the slurry fed to it. Crystal size distributions are measured from para-xylene fed to this centrifuge and the crystal size distribution of the solids recovered and of the solids rejected from it. The weight percent solids retained in the cake as a function of crystal size is shown in line 1 of Table VII. The corresponding weight percent solids of meta-xylene crystals which can be calculated to be retained are shown in line 2. These data are calculated from the relative settling rates in FIG. 1 which shows that meta-xylene crystals about 350 microns long settle at approximately the same rate as para-xylene crystals 200 microns long. Lines 3 and 4 show the actual crystal size distributions measured in the crystallizer slurry obtained from Run 1(g) of Table VI. If one then multiplies line 1 times line 3 and line 2 times line 4, one obtained respectively the data in line 5 and 6 which will reflect the percent of para-xylene solids and the percent of meta-xylene solids of each crystal size recovered in a typical commercial centrifuge from the mixture of crystals in the feed slurry. This, if one started with the feed used in Examples 4 and 5 containing 14.5% ethylbenzene, 8.8% para-xylene, 64.5% meta-xylene and 11.5% orthoxylene and crystallized at —94° F., one would obtain a slurry containing 24.7% solids comprising about 87% meta-xylene and 13% para-xylene. If this slurry were then fed to a 40" x 60" Bird Screen-Bowl centrifuge, 64.6% of the para-xylene would be recovered as solids, the remainder being rejected in the overflow; and 92.9% of the meta-xylene would be recovered as solids, the remainder also being rejected in the overflow. The composition of these solids would be 90.6% meta-xylene and 9.4% para-xylene and suitable for recrystallization or partial melting to obtain purer meta-xylene. These data then illustrate that commercial and available centrifuge equipment can be used to effect the separation of meta-xylene from para-xylene by classification.

It should be understood that much greater enrichment of meta-xylene can be obtained through the use of commercial centrifuges by merely varying the rotational speed, e.g., centrifugal force, of the centrifuge and/or the slurry feed rate for the xylene mixture. For example, it is contemplated that a centrifuge operating under the same classification conditions as the cyclone described in Example 6 would result in the enrichment of a feed composition having 87.5 percent meta-xylene to a composition having 97.5 percent meta-xylene.

TABLE VII.— CRYSTAL SIZE DISTRIBUTION: WEIGHT PERCENT BETWEEN INTERVALS

| Microns | 1–100 | 100–200 | 200–300 | 300–400 | 400–500 | 500–600 | 600–700 | Total |
|---|---|---|---|---|---|---|---|---|
| Weight percent of total solids retained in cake in each length interval (bird 40" x 60" screen-bowl centrifuge) | | | | | | | | |
| (1) PX | 59 | 80 | 92 | 96 | 100 | 100 | 100 | |
| (2) MX | | 59 | 80 | 92 | 96 | 100 | 100 | |
| Typical weight percent crystal size distribution, Run 1 (solids=87/13 MX/PX) | | | | | | | | |
| (3) PX | 73.1 | 26.9 | | | | | | 100 |
| (4) MX | 0.1 | 2.6 | 12 | 28 | 31.3 | 19.5 | 6.5 | 100 |
| Weight percent solids recovered | | | | | | | | |
| (5) PX | 43.1 | 21.5 | | | | | | 64.6 |
| (6) MX | | 1.5 | 9.6 | 25.8 | 30.0 | 19.5 | 6.5 | 92.9 |

See the following:
Solids recovered:
  meta-Xylene (87.0) (92.9), percent _____ 80.8
  para-Xylene (13.0) (64.6), percent _____ 8.4

Total, percent _____ 89.2
Composition:
  meta-Xylene, percent _____ 90.6
  para-Xylene, percent _____ 9.4

Example 8

This example demonstrates that high purity meta-xylene can be obtained by recrystallization of the meta-xylene solids obtained by the disclosed crystal classification. In this way, one can obtain greatly enriched high purity meta-xylene by recrystallization of the meta-xylene obtained by crystal classification.

Approximately 1100 grams of an 86.2 mole percent meta-xylene solution such as could be recovered from para-xylene reject filtrate by crystallization-classification was cooled in a glass vessel to —64.9° F. After 96 minutes an analysis of the resulting slurry's mother liquor showed that 7.9% meta-xylene solids had formed. The temperature was then lowered to —65.9° F. and after 14 minutes the slurry was centrifuged for 1 minute in a centrifugal field of 920×gravity to yield 101 grams of cake and 1004 grams of filtrate. Analysis of the cake and filtrate showed the cake to be 98.6% meta-xylene which included 8.0% adhering mother liquor.

SAMPLE ANALYSES (MOLE PERCENT)

| | Feed | Mother liquor, —64.9° F. | Cake | Filtrate |
|---|---|---|---|---|
| Toluene | 1.18 | 1.22 | 0.20 | 1.46 |
| Ethylbenzene | 2.73 | 2.96 | 0.23 | 3.07 |
| Para-xylene | 8.61 | 9.27 | 0.75 | 9.68 |
| Meta-xylene | 86.17 | 84.80 | 98.63 | 83.99 |
| Ortho-xylene | 1.32 | 1.75 | 0.20 | 1.80 |

Example 9

These tests, summarized in Table VIII, were carried out to show that simple screening can also be used to obtain concentrates of meta-xylene. In Test 1, the feed was crystallized at —70° C., in the laboratory apparatus described in Example 1, to produce a slurry whose solids had the composition 16.6% para-xylene-83.4% meta-xylene. The slurry was transferred to a vibrating screen, which was enclosed in a refrigerated compartment held at —70° C. The screen had pores of 250 microns and a vibrating angle of 50° was used. The slurry passing through the screen was collected, and the crude solids remaining on the screen as well as the crude solids which overflowed the screen were collected. The overflow actually contained about 48% solids, whose composition was 95% meta-xylene, 5% para-xylene, thus demonstrating a dramatic enrichment by screen separation.

TABLE VIII

Test 1

| | Crystallizer feed | Solids composition of slurry from crystallizer | Overflow | Solids composition of overflow | Underflow | Solids composition of underflow |
|---|---|---|---|---|---|---|
| Percent: | | | | | | |
| EB | 19.2 | 16.6 | 12.8 | 5 | 22.4 | 39 |
| PX | 8.9 | 83.4 | 6.1 | 95 | 9.6 | 61 |
| MX | 59.8 | | 73.6 | | 54.6 | |
| OX | 12.1 | | 7.5 | | 13.4 | |
| Solids in stream | | 11 | 48 | | 8 | |

Test 2

| Percent: | | | | | | |
|---|---|---|---|---|---|---|
| EB | 17.0 | | 13.3 | | 18.9 | |
| PX | 9.4 | 18 | 7.7 | 10 | 10.3 | 31 |
| MX | 52.0 | 66 | 61.2 | 80 | 47.3 | 42 |
| OX | 21.5 | 16 | 17.5 | 10 | 23.5 | 27 |
| Weight (grams) | 1,280 | | 430 | | 842 | |
| Percent solids in stream | | 25 | 41 | | 16.5 | |

In Test 2, the same apparatus was used to produce a slurry at —73° C. The solids had a composition of 18% para-xylene, 66% meta-xylene and 16% ortho-xylene. This slurry was fed to the screen with 250 micron pores, which was thermostated at —73°. A vibrating screen angle of 40° was used for this test. The overflow solids had a composition of 10% para-xylene, 80% meta-xylene, and 10% ortho-xylene again demonstrating a significant enrichment in meta-xylene content by screening, but also demonstrating that meta-xylene can be separated from both para-xylene and ortho-xylene by this technique.

The scope and nature of the invention can best be illustrated by the typical example of commercial use illustrated in FIG. 3. Flow rates and compositions for the streams are summarized in Table IX. A fresh feed xylene, typically from an extracted reformate, is fed to the system via line 1 and combined with the effluent of an isomerization reactor. The combined streams are fed to distillation tower 2 where low boiling components such as toluene, water, benzene, paraffins and naphthenes are taken overhead and are removed via line 3. A bottoms stream then passes via line 4 into column 5 where the contained ethylbenzene, substantially all of the meta-xylene and para-xylene and part of the ortho-xylene are taken overhead and fed to the crystallization system by line 10. A bottoms stream comprising ortho-xylene and heavier aromatics is fed by line 6 into distillation tower 7. $C_9$ and heavier components are removed through line 8 and an ortho-xylene rich material is fed via line 9 to the isomerization system. The xylene concentrate from distillation tower 5 and from which a part of the ortho-xylene has been removed, is combined with a recycle from line 24 and fed to crystallizer 11 which may be one or more crystallizers in series. The final temperature of this crystallization is about —66° C. The slurry resulting from the crystallization is fed from line 12 to centrifuge 13 from which a cake rich in para-xylene is fed by line 14 to melt drum 15. The melted mixture is then fed by line 16 to a second stage crystallizer 17 operated at about 0° C. The slurry obtained from this crystallizer is subjected to centrifugal separation in centrifuge 19 to provide a solids material comprising substantially high purity para-xylene which is removed by line 20. A portion of this material can be melted and recycled via line 21 as wash. The reject filtrate from centrifuge 19 leaves by line 22 and a portion is recycled by line 23 to the second stage crystallizer 17 to maintain a proper slurry concentration.

The remainder of this reject is fed via line 24 back to the first stage of the crystallization. Reject filtrate from the first stage centrifuge is fed by line 25 to crystallizer 26 which is operated at a minimum temperature of about —77° C. and in which is grown a slurry consisting of a mixture of meta-xylene and para-xylene crystals. The slurry from this crystallization system is fed by line 27 to a screenbowl centrifuge in which the smaller crystals and the liquid are removed via line 39 and a solid enriched in meta-xylene is fed by line 29 to melt tank 30. The melted mixture of meta-xylene and para-xylene rich in meta-xylene relative to the eutectic mixture is then fed by line 31 to crystallizer 42 which is operated at a temperature above the eutectic of the contained meta-xylene and para-xylene. Pure meta-xylene is thus crystallized and the slurry is fed by line 33 to a centrifuge 34. The solid product which is removed by line 35 is substantially pure meta-xylene. The reject filtrate leaves the centrifuge and a portion of it may be fed via line 36 back to the crystallizer to maintain a desirable slurry concentration. The remainder is fed by line 37 back to crystallizer 26. The reject filtrate from the centrifuge-classifier 28 leaves via line 38 where it is mixed with the ortho-xylene concentrate from line 9 and fed via line 39 to an isomerizer 40 wherein the xylenes are converted substantially to an equilibrium mixture of xylenes and fed via line 41 back into the system.

The invention is not limited to the particular embodiment herein described, and it will be evident to one skilled in the art that various modifications may be made which fall within the scope of this invention. For example, the screen-bowl centrifuge 28 could be replaced by one or more cyclones or hydroclones in series followed by a centrifuge. Alternatively, instead of melting the entire solids product in melt drum 30, partial melting could be employed so that only the contained para-xylene and some meta-xylene is melted leaving a resultant slurry of purer meta-xylene to be fed directly to centrifuge 34 without the intervening crystallization step of crystallizer 32. It is also evident that the ortho-xylene concentrate obtained in line 9 could be processed further to obtain pure ortho-xylene as a commercial and saleable product.

TABLE IX

| Stream number | 1 | | 3 | | 6 | | 8 | |
|---|---|---|---|---|---|---|---|---|
| Stream description | Fresh feed | | Light hydrocarbons | | Feed to tower 7 | | Heavy hydrocarbons | |
| | Lbs./hr. | Wt. percent | Lbs./hr. | Wt. percent | Lbs./hr. | Wt. Percent | Lbs./hr. | Wt. percent |
| Components, lbs./hr.: | | | | | | | | |
| $C_7$ hydrocarbons | 410 | 1.00 | 4,829 | 71.28 | 451 | 0.32 | 0 | 0.0 |
| $C_8$ naphthenes | 0 | 0.00 | 1,272 | 18.77 | 106 | 0.07 | 0 | 0.0 |
| Ethylbenzene | 6,146 | 15.00 | 450 | 6.64 | 23,042 | 16.17 | 0 | 0.0 |
| Meta-xylene | 18,317 | 44.70 | 112 | 1.65 | 62,486 | 43.85 | 0 | 0.0 |
| Ortho-xylene | 7,417 | 18.10 | 0 | 0.0 | 30,808 | 21.62 | 13 | 1.70 |
| Para-xylene | 8,154 | 19.90 | 112 | 1.65 | 23,626 | 16.58 | 0 | 0.0 |
| $C_9$ hydrocarbons | 488 | 1.19 | 0 | 0.0 | 1,311 | 0.92 | 1,156 | 63.45 |
| $C_{10}$ hydrocarbons | 45 | 0.11 | 0 | 0.0 | 670 | 0.47 | 635 | 34.85 |
| Total | 40,977 | 100.00 | 6,775 | 100.00 | 142,500 | 100.00 | 1,822 | 100.00 |

| Steam number | 9 | | 10 | | 20 | | 25 | |
|---|---|---|---|---|---|---|---|---|
| Steam description | OX concentrate | | Feed to PX cryst. train | | PX product | | Feed to MX-PX cryst. | |
| | Lbs./hr. | Wt. percent | Lbs./hr. | Wt. percent | Lbs./hr. | Wt. percent | Lbs./hr. | Wt. percent |
| Components, lbs./hr.: | | | | | | | | |
| $C_7$ hydrocarbons | 0 | 0.0 | 451 | 0.35 | 0.4 | 0.0 | 450 | 0.40 |
| $C_8$ naphthenes | 0 | 0.0 | 106 | 0.08 | 0.4 | 0.0 | 105 | 0.09 |
| Ethylbenzene | 2 | 0.02 | 23,040 | 18.04 | 23 | 0.16 | 23,018 | 20.23 |
| Meta-xylene | 703 | 5.78 | 61,743 | 48.34 | 80 | 0.57 | 61,667 | 54.21 |
| Ortho-xylene | 11,359 | 93.34 | 18,785 | 14.71 | 37 | 0.26 | 18,749 | 16.48 |
| Para-xylene | 106 | 0.87 | 23,514 | 18.41 | 13,835 | 98.99 | 9,675 | 8.51 |
| $C_9$ hydrocarbons | 0 | 0.0 | 91 | 0.07 | 0.4 | 0.0 | 90 | 0.08 |
| $C_{10}$ hydrocarbons | 0 | 0.0 | 0 | 0.00 | 0.0 | 0.0 | 0 | 0.00 |
| Total | 12,170 | 100.00 | 127,730 | 100.00 | 13,976.2 | 100.00 | 113,754 | 100.00 |

TABLE IX—Continued

| Stream number | 35 | | 37 | | 39 | | 40 | | 42 | |
|---|---|---|---|---|---|---|---|---|---|---|
| Stream description | MX product | | MX-PX recycle | | Rej. fil. from MX-PX unit | | Isom. feed | | Isom. effluent | |
| | Lbs./hr. | Wt. percent | Lbs./hr. | Wt. percent | Lbs./hr. | Wt. percent | Lbs./hr. | Wt. percent | Lbs./hr. | Wt. percent |
| Components, lbs./hr.: | | | | | | | | | | |
| $C_7$ hydrocarbons | 0 | 0.0 | 9 | 0.06 | 450 | 0.47 | 388 | 0.36 | 3,116 | 2.90 |
| $C_8$ naphthenes | 0 | 0.0 | 2 | 0.01 | 105 | 0.11 | 103 | 0.10 | 794 | 0.74 |
| Ethylbenzene | 5 | 0.03 | 435 | 2.96 | 23,013 | 24.22 | 20,372 | 19.04 | 16,435 | 15.29 |
| Meta-xylene | 18,604 | 99.22 | 12,692 | 86.33 | 43,063 | 45.33 | 48,914 | 45.72 | 45,312 | 42.14 |
| Ortho-xylene | 23 | 0.12 | 334 | 2.27 | 18,726 | 19.71 | 26,996 | 25.23 | 22,816 | 21.22 |
| Para-xylene | 118 | 0.63 | 1,229 | 8.36 | 9,557 | 10.06 | 9,573 | 8.95 | 17,312 | 16.10 |
| $C_9$ hydrocarbons | 0 | 0.0 | 1 | 0.01 | 90 | 0.09 | 423 | 0.40 | 1,079 | 1.00 |
| $C_{10}$ hydrocarbons | 0 | 0.0 | 0 | 0.0 | 0 | 0.00 | 216 | 0.20 | 656 | 0.61 |
| Total | 18,750 | 100.00 | 14,702 | 100.00 | 95,004 | 100.00 | 106,982 | 100.00 | 107,520 | 100.00 |

We claim:

1. A process for separating meta-xylene and meta-xylene concentrates from a liquid mixture of primarily $C_8$ aromatic isomers which comprises:
selecting a mixture of $C_8$ isomers containing meta-xylene and para-xylene in substantially their eutectic ratio;
cooling said mixture of isomers for a time and at a temperature sufficient to form a slurry of mother liquor and crystals, said crystals comprising discrete meta-, para- and ortho-xylene crystals and containing less than 10 percent by weight ortho-xylene crystals, and said crystallization taking place in the presence of an undiluted mother liquor which is less dense than said crystals; and
selectively concentrating said discrete meta-xylene crystals from the remaining crystals by crystal classification, in the presence of their naturally occurring, undiluted mother liquor.

2. The process of claim 1 wherein the mixture of $C_8$ isomers containing meta- and para-xylene in substantially their eutectic ratio is about 8 to 13 percent by weight para-xylene, about 8 to 20 percent by weight ethylbenzene, about 15 to 25 percent by weight ortho-xylene, and the balance being meta-xylene.

3. The process of claim 1 wherein the cooling of the mixture of isomers is carried out at a temperature in the range of about −65° to −90° C.

4. The process of claim 3 wherein the cooling of said mixture of isomers is carried out for a time sufficient to provide a slurry of liquor and crystals having a solids content in the range of about 10 to 40 percent by weight solids.

5. The process of claim 1 wherein said discrete meta-, para- and ortho-xylene crystals are separated by physical classification according to individual crystal sizes and shapes.

6. The process of claim 5 wherein classification is accomplished by one or more stages of gravity settling.

7. The process of claim 5 wherein classification is accomplished by one or more stages of elutriation.

8. The process of claim 5 wherein classification is accomplished by one or more stages of screening.

9. The process of claim 5 wherein crystal classification is carried out by subjecting said mixture of discrete crystals to the action of centrifugal force in one or more stages.

10. The process of claim 9 wherein the centrifugal force is applied in a solid bowl or a solid-screenbowl centrifuge.

11. The process of claim 9 wherein the centrifugal force is applied by one or more cyclones arranged in series.

12. The process of claim 9 wherein the solids enriched in meta-xylene are recovered from their respective slurries by filtration or by centrifugation.

13. The process of claim 12 wherein the recovered solids are further enriched in meta-xylene by subjecting the crystals to total melting and recrystallization.

14. The process of claim 12 wherein high purity meta-xylene is recovered from the enriched solids by partially melting to obtain para-xylene and some of the meta-xylene in a liquid state and separating them from solids.

15. The process of claim 1 wherein substantially all the ethylbenzene contained in said mixtures of $C_8$ aromatic isomers is removed prior to crystallization of the para-xylene-meta-xylene mixture.

16. The process of claim 1 wherein substantially all of the ethylbenzene and substantially all of the ortho-xylene contained in said mixture of isomers is removed from the feed xylenes prior to crystallization of para-xylene and meta-xylene-para-xylene mixtures.

17. A process for separating meta-xylene from a liquid mixture of $C_8$ aromatic isomers which comprises:
selecting a mixture of $C_8$ isomers containing meta- and para-xylene in substantially their eutectic ratio and ortho-xylene at a concentration below the eutectic ratio of meta- and ortho-xylene;
cooling said mixture of isomers for a time and at a temperature sufficient to crystallize meta- and para-xylene alone without crystallizing ortho-xylene, said meta- and para-xylene crystals having a density greater than that of their naturally occurring mother liquor; and
separating by crystal classification said meta-xylene crystals from said para-xylene crystals in the presence of their naturally occurring undiluted mother liquor.

18. The process of claim 17 wherein said mixture of $C_8$ isomers is prepared by adjusting the concentration of ortho-xylene contained in a mixture of $C_8$ isomers, having meta- and para-xylene in substantially their eutectic ratio, to a concentration below the eutectic ratio of ortho- and meta-xylene.

19. The process of claim 18 wherein the concentration of ortho-xylene is adjusted by fractionation.

20. The process of claim 17 wherein the mixture of $C_8$ isomers containing meta- and para-xylene in substantially their eutectic ratio is about 8 to 13 percent by weight para-xylene, about 8 to 20 percent by weight ethylbenzene, about 15 to 25 percent by weight ortho-xylene, and the balance being meta-xylene.

21. The process of claim 17 wherein the cooling of the mixture of isomers is carried out at a temperature in the range of about −65° to −90° C.

22. The process of claim 21 wherein the cooling of said mixture of isomers is carried out for a time sufficient to provide a slurry of liquor and crystals having a solids content in the range of about 10 to 40 percent by weight solids.

23. The process of claim 17 wherein said classification is carried out according to the relative crystal sizes, shapes and settling rates of meta- and para-xylene crystals.

24. The process of claim 23 wherein classification is accomplished by one or more stages of gravity settling.

25. The process of claim 23 wherein classification is accomplished by one or more stages of elutriation.

26. The process of claim 23 wherein classification is accomplished by one or more stages of screening.

27. The process of claim 23 wherein crystal classification is carried out by subjecting the mixture of crystals to the action of centrifugal force.

28. The process of claim 27 wherein the centrifugal force is applied in a solid bowl or a solid-screenbowl type centrifuge.

29. The process of claim 27 wherein the centrifugal force is applied by one or more cyclones in series.

30. The process of claim 27 wherein the solids enriched in meta-xylene are recovered from their respective slurries by filtration or centrifugation.

31. The process of claim 17 wherein substantially all the ethylbenzene contained in said mixture of isomers is removed prior to crystallization of the meta-/para-xylene mixture.

32. The process of claim 17 in which substantially all of the ethylbenzene and substantially all of the orthoxylene is removed from the feed xylenes prior to crystallization of para-xylene and the meta-/para-xylene mixtures.

References Cited
UNITED STATES PATENTS

| | | | |
|---|---|---|---|
| 3,544,646 | 12/1970 | Broughton et al. | 260—674 |
| 3,029,278 | 4/1962 | Spiller et al. | 260—727 |
| 3,277,200 | 10/1966 | Smith et al. | 260—674 |
| 2,622,115 | 12/1952 | Carney | 260—674 |
| 2,777,888 | 1/1957 | Hoff et al. | 260—674 |
| 2,884,470 | 4/1959 | Harrison et al. | 260—674 |

DELBERT E. GANTZ, Primary Examiner

C. E. SPRESSER, JR., Assistant Examiner

U.S. Cl. X.R.

62—58; 260—707, 668 A

UNITED STATES PATENT OFFICE
CERTIFICATE OF CORRECTION

Patent No. 3,798,282      Dated March 19, 1974

Inventor(s) Alan G. Bemis, John K. Darin & Melvern C. Hoff

It is certified that error appears in the above-identified patent and that said Letters Patent are hereby corrected as shown below:

Col. 2, line 24, "inventments" should be "investments", per specification page 2, line 29.

Col. 2, line 62, "this" should be "the" per specification page 4, line 2.

Col. 5, line 23, "to" should be "of" per specification line 32, page 9.

Col. 9, line 74, "This" should be "Thus" per specification page 22, line 25.

Col. 14, line 16, "42" should be "32" per specification page 29, line 15.

Table I, Col. 5, "Size ratio" line 10 -"17" should be "107" per Table I "Size ratio" page 9 - line 10 of Table.

Table VIII - Solids in Stream - "11" should be "21", 5th line in table, per specification, page 27, line 5 in table.

Table IX - line 5, "13" should be "31" per specification page 31, line 5 in Table.

Signed and sealed this 12th day of November 1974.

(SEAL)
Attest:

McCOY M. GIBSON JR.
Attesting Officer

C. MARSHALL DANN
Commissioner of Patents